May 13, 1924.
G. J. LAMBERT
SIRUP PITCHER
Filed Aug. 22, 1921
1,493,885
2 Sheets-Sheet 1
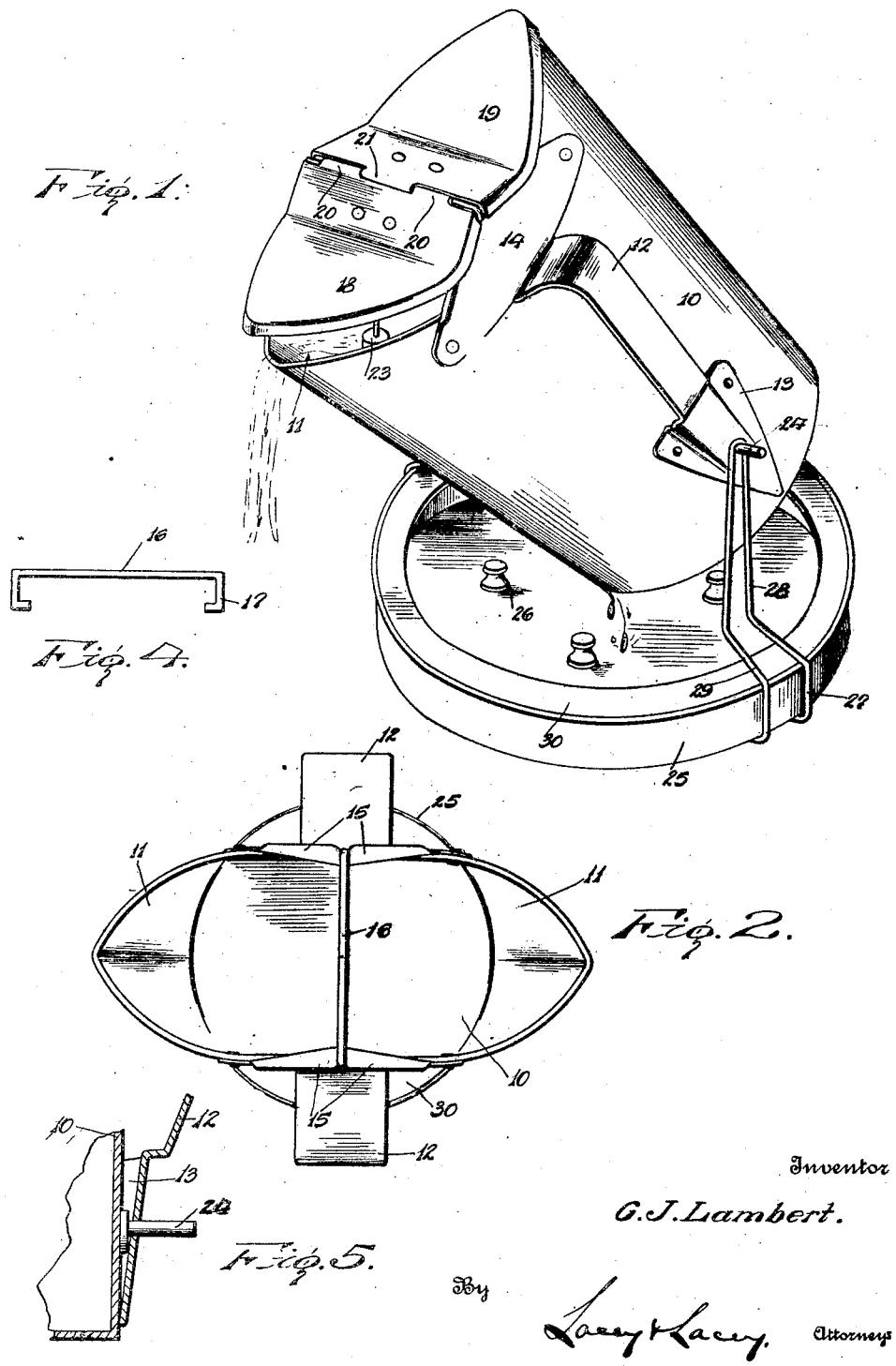

May 13, 1924.
G. J. LAMBERT
SIRUP PITCHER
Filed Aug. 22, 1921
1,493,885
2 Sheets-Sheet 2
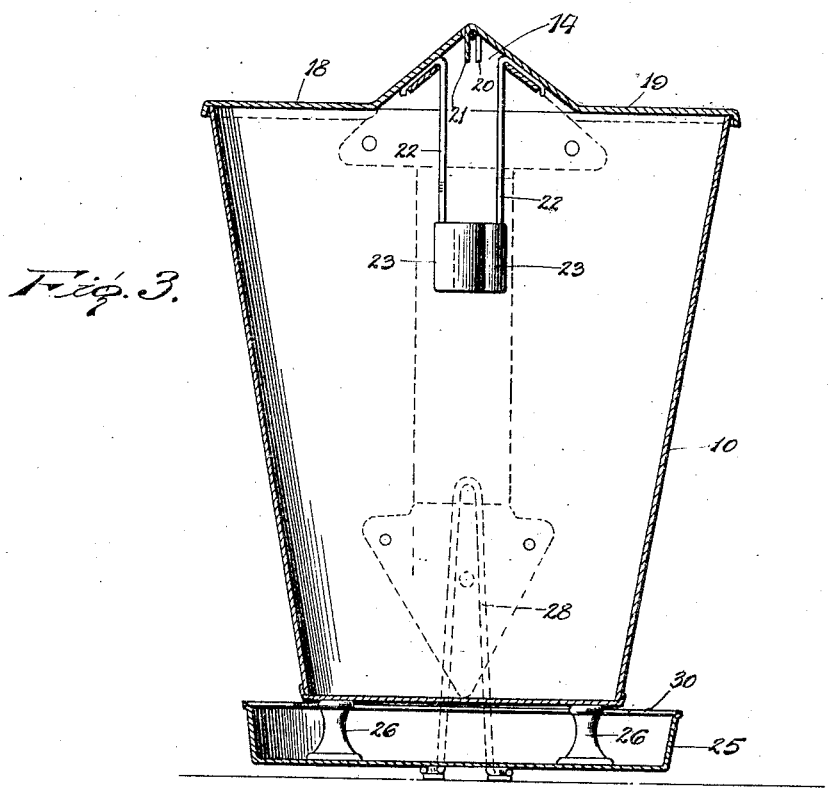
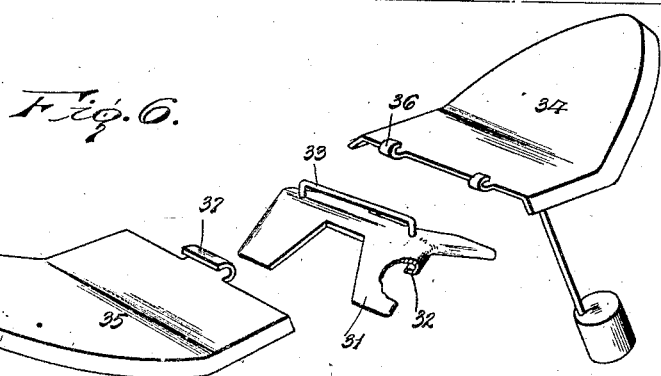
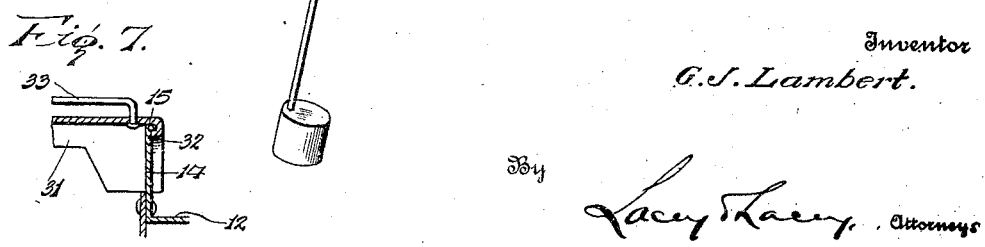
Inventor
G. J. Lambert.
By Lacey & Lacey, Attorneys Patented May 13, 1924.

1,493,885

UNITED STATES PATENT OFFICE.

GUSTAVE J. LAMBERT, OF SALINA, KANSAS.

SIRUP PITCHER.

Application filed August 22, 1921. Serial No. 494,317.

*To all whom it may concern:*

Be it known that I, GUSTAVE J. LAMBERT, a citizen of the United States, residing at Salina, in the county of Saline and State of Kansas, have invented certain new and useful Improvements in Sirup Pitchers, of which the following is a specification.

This invention relates to a sirup pitcher and has as one of its principal objects to provide a device of this character wherein the pitcher may be tilted in either one direction or the other for pouring sirup therefrom and wherein the pitcher will be provided with lids normally held to close the pitcher.

A still further object of the invention is to provide a pitcher wherein the lids will be weight actuated so that when the pitcher is tilted, a corresponding lid will be moved to open position while when the pitcher is returned to the vertical, the lid will be closed.

Another object of the invention is to provide a pitcher wherein any sirup running down the sides thereof will be caught and retained to thus prevent the pitcher from soiling a table cloth or the like.

And the invention has as a still further object to provide a pitcher employing a base tray for catching any sirup running down the sides of the pitcher and wherein said tray will be mounted to swing upon the pitcher so that when the pitcher is lifted and tilted in either one direction or the other, the tray will automatically assume a horizontal position beneath the lower end of the pitcher.

Other and incidental objects will appear hereinafter.

In the drawings:

Figure 1 is a perspective view showing my improved pitched tilted,

Figure 2 is a top plan view of the device, the lids being removed,

Figure 3 is a vertical sectional view taken medially through the device,

Figure 4 is a detail elevation of the hinge rod employed,

Figure 5 is a detail section showing the mounting of the tray supporting studs of the device, Figure 6 is a perspective view showing a slight modification of the invention, and Figure 7 is a detail section of the modified structure.

In carrying the invention into effect, I employ a container 10 flattened toward its upper end to define a mouth 11 at each side of the container and mounted upon the flattened sides of said container are handles 12. At their lower ends, these handles are provided with ears 13 riveted or otherwise secured to the container while at their upper ends, said handles are formed with triangular shaped ears 14 also riveted or otherwise secured to the container and projecting above the upper edge thereof. Formed on the oppositely inclined edges of the ears 14 are, as shown in Figure 2, pairs of outwardly directed inclined flanges 15 and extending transversely across the container at its upper end is a hinge rod 16. This hinge rod is disposed between the pairs of flanges 15 at their upper ends and is provided with downwardly and inwardly turned hooks 17 overlying the ears 14 of the handles 12 and engaging in suitable openings therethrough, the hinge rod serving to hold the side walls of the container under tension so that the rod is thus yieldably and detachably retained upon the container. Coacting with the hinge rod are companion lids 18 and 19 respectively. These lids are formed to fit the inclined edges of the ears 14 and are provided with marginal flanges normally depending over said ears as well as over the mouths 11 of the container. At its inner end edge the lid 18 is provided with spaced vertically disposed hooks 20 engaging over the rod 16 and formed on the lid 19 at its inner end edge is a similar hook 21 engaging over the rod between the hooks 20 mating therewith, the several hooks hingedly connecting the lids with the rod. At the same time, the lids may be readily removed by simply lifting upwardly thereon to disengage the hooks from the rod and, as will be seen, this construction provides an arrangement whereby the container may be readily filled. Secured to each of the lids therebeneath is a depending rod 22 and mounted upon the lower ends of said rods are weights 23. Thus, as will be at once appreciated, when the container is tilted, as in Figure 1, for instance, for discharging the contents therefrom the weight upon the lid 18 will swing to open said lid while the weight upon the lid 19 will serve to hold this latter lid closed. Conversely, when the container is tilted in the opposite direction, the lid 19 will be opened while the lid 18 will be held closed, the weights upon the lids serving, as shown in Figure 3, under normal circumstances, to hold both the lids closed.

Extending through the lower ends of the handles 12 are headed studs 24, the heads of which are, as shown in Figure 5, confined between the handles and the sides of the container. Mounted to swing upon said studs is a base tray 25 and upstanding within said tray is a plurality of posts 26 spaced apart in such manner that the container may, as shown in Figure 3, be readily rested upon the posts. Secured at their lower ends beneath the tray, at opposite sides thereof, are hangers 27. These hangers may each be formed of a length of suitable resilient wire bent to define upstanding loops 28 at the lower ends of which are arms 29 overhanging the tray, the loops being offset inwardly over the tray and lying close to the lower ends of the handles 12 to engage over the studs 24. Thus, the tray is slidably and pivotally connected with the container. When the container is lifted, the studs 24 will, of course, ride upwardly within the loops 28 when the tray will be suspended from the studs so that, as shown in Figure 1, the tray may gravitate to assume a horizontal position beneath the container. Accordingly, the tray will be disposed to catch any sirup running down the sides of the container. Similarly, when the container is again righted, the tray will be properly disposed beneath the lower end of the container so that the entire device may be rested upon a table or the like, the studs 24 of the container riding downwardly within the loops 28 of the hangers, as the container is rested upon the posts 26. These posts are, of course, provided for supporting the container out of any sirup which may collect within the tray and in order to prevent possible spilling of any sirup within the tray a guard ring 30 is fitted therein. This ring is formed to coact with the side flange of the tray at its upper edge and is removably held in place by the arms 29 of the hangers. Thus, the tray may be detached from the container by simply spreading the hangers when the guard ring may then be removed from the tray. Accordingly, the tray may be easily cleaned.

In Figures 6 and 7 of the drawings, I have illustrated a slight modification of the invention. In this modification, I employ a cross plate 31 provided at its ends with offset inclined flanges 32 which, as shown in Figure 7, are adapted to engage over the pairs of flanges 15 of the container for connecting the plate thereto and mounted upon said plate is a hinge rod 33. Lids 34 and 35 are employed. The lid 34 is provided with spaced upturned hooks 36 adapted to engage over the rod 33 while the lid 35 is provided with a single upturned hook 37 adapted to engage over the rod between the hooks 36 mating therewith. Thus, these hooks will swingingly connect the lids with said rod to overlie the mouths of the container. Otherwise, this modified form of the invention is identical with the preferred construction and further description is accordingly believed unnecessary.

Having thus described the invention, what is claimed as new is:

1. A device of the character described including a container having ears projecting thereabove, a freely detachable hinge rod extending between said ears over the container tensioning the ears for holding the rod against displacement, and weight operated lids pivoted upon said rod normally closing the container.

2. A device of the character described including a container having ears, freely detachable means extending between said ears across the container tensioning said ears for holding said means against displacement, and lids pivoted upon said means normally closing the container.

3. A device of the character described including a container having ears, a hinge rod extending transversely between said ears across the container and provided at its ends with hooks extending at the outer sides of the ears, said hooks being formed with inwardly directed terminals extending toward each other engaging the ears for connecting the rod thereto, and lids pivoted upon said rod normally closing the container, the rod tensioning the ears in binding engagement with said hooks for thus holding the hooks against disengagement from the ears.

4. In a sirup pitcher, the combination of a container, a hinge rod spanning the container flexing opposite walls thereof whereby said walls are held under tension by the rod locking the rod against displacement, and lids normally closing the container and provided with digitating depending hooks engaging over said rod pivotally connecting the lids thereto, the hooks being freely disengageable upwardly from the rod to release the lids.

5. In a sirup pitcher, a container, ears upstanding therefrom at opposite sides of the container and provided with spaced flanges, a hinge rod spanning the container and provided with depending hooks extending between the inner ends of said flanges and engaging through the ears from the outer sides thereof, the flanges holding the rod against pivotal movement upon the hooks and the rod flexing the ears toward each other and thus holding the ears under tension locking the hooks against disengagement therefrom, and lids pivoted upon said rod normally closing the container.

In testimony whereof I affix my signature.

GUSTAVE J. LAMBERT. [L. S.]